United States Patent [19]

Ariyasu et al.

[11] Patent Number: 5,362,935
[45] Date of Patent: Nov. 8, 1994

[54] METHOD OF BUTT-WELDING BAR STEEL AND DEVICE THEREFOR

[75] Inventors: Hisashi Ariyasu, 37-9, Minami-Magome 4-chome, Ota-ku, Tokyo-to; Yoichi Aikawa, Ichikawa, both of Japan

[73] Assignees: Toatsu Corporation; Hisashi Ariyasu, both of Tokyo, Japan

[21] Appl. No.: 85,004

[22] Filed: Jun. 29, 1993

[30] Foreign Application Priority Data

Jun. 30, 1992 [JP] Japan ................. 4-172788

[51] Int. Cl.$^5$ ............................. B23K 9/00
[52] U.S. Cl. ................. 219/56; 219/137 R; 228/138
[58] Field of Search ........... 219/56, 59.1, 61, 156, 219/137 R, 99; 228/138, 139

[56] References Cited

U.S. PATENT DOCUMENTS 3,539,763  11/1970  Brodsky ............... 219/137 R

FOREIGN PATENT DOCUMENTS 55-64976  5/1980  Japan ................. 219/56

Primary Examiner—Clifford C. Shaw
Attorney, Agent, or Firm—Ladas & Parry

[57] ABSTRACT

An end portion of a steel bar such as a reinforcing bar is planed at an angle to form a oblique tip surface having a prescribed angle for an arc welding. The end portion of the steel bar is fitted within a guide member comprising a butting tab that extends forward, guide edge portions that start from diametrically opposite sides of a base portion of the butting tab and extend backward from a position at a distance from a surface to which the bar is to be welded, but protrude further outward than the oblique tip surface, and a slit formed in the axial direction of end portions of the guide edge portions. An end portion of the butting tab is trimmed into an end shape in accordance with a surface to which the bar is to be welded and is butted against that surface. Weld beads are then built up in sequence from the inner surface of the butting tab and between the surface to which the bar is to be welded and the oblique tip surface at the end portion of the steel bar, to form a single weld.

11 Claims, 6 Drawing Sheets

METHOD OF BUTT-WELDING BAR STEEL AND DEVICE THEREFOR

BACKGROUND OF THE INVENTION

The present invention relates to a method of using arc welding to butt-weld an end surface of a piece of bar steel such as a reinforcing bar to a flat surface such as that of a steel column to form a T-joint, and a device utilizing the same.

Recently, steel-reinforced concrete buildings and the like have become taller and larger, the numbers of reinforcing bars used in these buildings have increased correspondingly, and it has also become common to use steel bars of larger diameters and longer lengths therefor.

When a reinforcing bar is welded to a surface such as a steel column, an end surface of the reinforcing bar is butt-welded to a side surface (either flat or curved) of the steel column. To enable this welding when using conventional methods, a planar steel plate 2 is temporarily welded as shown in FIG. 14 to a side surface of a vertically erected steel column 1, an end portion that is an oblique tip surface 4 of a reinforcing bar 3 is mounted so it is held by the steel plate 2, and weld beads W are built up by arc-welding between the oblique tip surface 4 and the steel column 1 to weld together the reinforcing bar 3 and the steel column 1. In this case, a side surface of the reinforcing bar 3 can also be welded to the steel plate 2.

As a result of the use of this welding method, the angle $\theta$ between the steel column 1 and the steel bar 3 is 90° and if, for example, a floor surface is formed on top of the reinforcing bar 3, the reinforcing bar 3 acts as a strengthener for the floor surface and provides resistance to bending and shear stresses due to floor loading. Note that the angle $\zeta$ can be varied within the range of 45° to 90°.

When it becomes necessary to weld a reinforcing bar to an existing steel column during the enlargement or remodeling of a concrete building on the spot, a hole is driven through a prescribed position of the steel column (such as a side surface thereof), the end portion of the reinforcing bar is inserted into this hole and is held thereby, and the portion of the hole is welded in order to weld the reinforcing bar and the steel column together into a single structure.

As an alternative method, a threaded hole could also be drilled in the side surface of the steel column, and a male thread cut into the end of the reinforcing bar could be engaged with the threaded hole to fix the bar to the column without welding.

However, when the steel plate 2 is temporarily welded the side surface of the steel column 1 and the reinforcing bar 3 is held thereon for arc-welding, as described in the first method above, the on-site work required for this temporary welding of the steel plate 2 must be added, and as such buildings become taller and larger, the number of places where reinforcing bars are welded also increases, so that this work become even less simple. Another problem involves the way in which the end of the reinforcing bar 3 becomes molten and starts to flow during the welding of the oblique tip surface 4 of the reinforcing bar 3 to the steel column 1, so that the thickness of the end of the reinforcing bar is reduced and thus it is difficult to guarantee the initially predicted strength thereof.

The second method, in which a hole is formed in the steel column and the reinforcing bar is inserted therein to be held for welding, also causes problems in that the thicknesses of the columns increase as buildings become bigger, so that it not only becomes extremely difficult to drill such holes on site, but also cross-sectional damage to the steel columns can occur and this can result in strength problems.

SUMMARY OF THE INVENTION

In the light of the above problems with the prior art, the present invention was devised with the objective of providing a method and device for butt-arc-welding bar steel which can either be used for butt-welding a T-joint between a steel bar such as a reinforcing bar and a surface to which the bar is to be welded such as that of a steel column, or for arc-welding reinforcing bars butted against each other.

As means of solving the above-described problems of the prior art, the present invention provides a method of forming a T-joint of a reinforcing bar by butt-arc-welding wherein an oblique tip surface of a steel bar such as a reinforcing bar is planed at an angle to form an oblique tip surface. A guide member that has a butting tab that extends forward therefrom, guide edge portions that start from diametrically opposite sides of a base portion of the butting tab and extend backward from a position at a distance from a surface to which the bar is to be welded, but protrude further outward than the oblique tip surface, and a slit formed in the axial direction of end portions of the guide edge portions is fitted around the outside of the end portion of the reinforcing bar. The end portion of the butting tab is then shaped to follow the surface to which the bar is to be welded, such as the surface of a steel column, and is butted up against that surface. A weld is then built up by weld beads in the space between the surface to which the bar is to be welded and the oblique tip surface at the end portion of the reinforcing bar, starting from the inner surface of the butting tab.

The present invention also relates to a device for forming a T-joint of a reinforcing bar by butt-arc-welding, which provides a sleeve-shaped guide member of a prescribed length that allows it to fit around the outside of the end portion of the reinforcing bar. This guide member has a tongue-shaped butting tab that extends forward from an outer end thereof, guide edge portions that start from diametrically opposite sides of a base portion of the butting tab and extend gradually backward from a position at a distance from a surface to which the bar is to be welded (such as that of a steel column), but protrude further outward than an oblique tip surface at an end portion of a reinforcing bar, and a slit formed in the axial direction of end portions of the guide edge portions.

In accordance with the present invention, an end portion of a steel bar such as a reinforcing bar is planed at an angle to form an oblique tip surface, the end portion of the reinforcing bar including the oblique tip surface is fitted into the guide member, the tip of the butting tab is butted up against the surface to which the bar is to be welded (such as the surface of a steel column), a welding rod is inserted through the slit in the guide member, and arc-welding is used to build up weld beads, starting at the butting tab. Metal melted from the end of the reinforcing bars is prevented from running out by the guide edge portions of the guide member and, once the weld has been built up far enough to a position corresponding to the diameter of the reinforcing bar, it is completed by forming a strengthening fillet weld thereon. This forms a but-arc-welded T-joint in which the end of the reinforcing bar and the surface to which the bar is welded are welded together, including the guide member. The reinforcing bar need not be welded perpendicular to the surface; it could be welded at any prescribed angle thereto, in which case the tip of the butting tab of the guide member is trimmed to correspond to that angle and then the remainder of the butt-arc-welding process is performed as described above. If the steel column is a circular column or if it has a curved surface, the tip of the butting tab of the guide member is trimmed in a curve to match the curve of the surface to which the bar is to be welded, and the remainder of the butt-arc-welding process is performed as described above.

With the present invention as described above, a guide member is fitted around an end portion of a steel bar such as a reinforcing bar, a tongue-shaped butting tab that protrudes forward from this guide member is butted against a surface to which the bar is to be welded (such as that of a steel column), a welding rod is inserted through the slit in the guide member into the space between the oblique tip surface (which is guarded by the guide edge portions of the guide member from the position at which the tip of the butting tab is in contact with the surface to which the bar is to be welded) and the surface to which the bar is to be welded, and weld beads are built up in sequence therein by arc-welding. Therefore, none of the melted metal that may be generated during the welding runs out of the guide member, welding without waste is enabled, the size of the end of the steel rod is not reduced, and unsuspected weakening by the welding is prevented. Since weld site is enclosed by the above-described guide member, effects due to the welding quality are reduced and reliable butt-welding is enabled.

Therefore, the present invention completely removes the need for preliminary work on site such as the temporary welding of a steel plate for supporting the steel bar or the drilling of holes, which are necessary in the prior art, and thus the efficiency of the welding work can be greatly improved. In particular, the present invention can prove extremely advantageous when applied to the butt-welding of T-joints between reinforcing rods and steel columns during the building and remodeling of large steel-reinforced concrete buildings.

DETAILED DESCRIPTION OF THE PREFERRED EMBODIMENTS

Embodiments of the present invention will be described below with reference to the accompanying figures.

Figure 1:
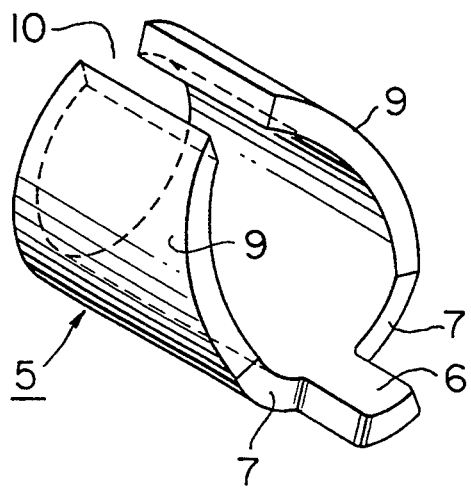
FIG. 1 is a perspective view of a guide member used in the butt-arc-welding of bar steel in accordance with the present invention.
Figure 2:
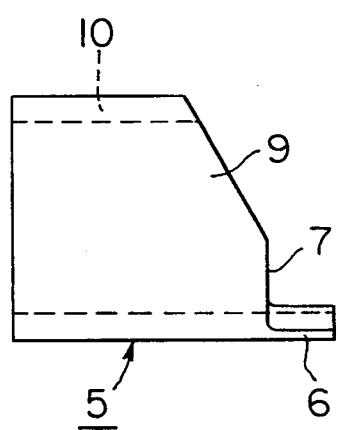
FIG. 2 is a side view of the guide member of FIG. 1.
Figure 3:
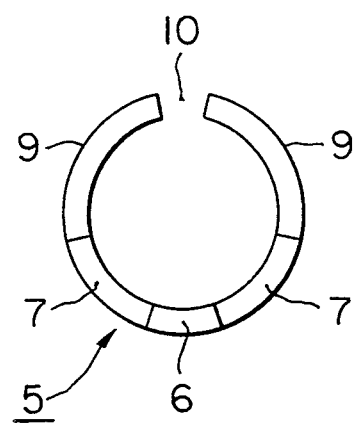
FIG. 3 is a frontal view of the guide member of FIG. 1.
Figure 7:
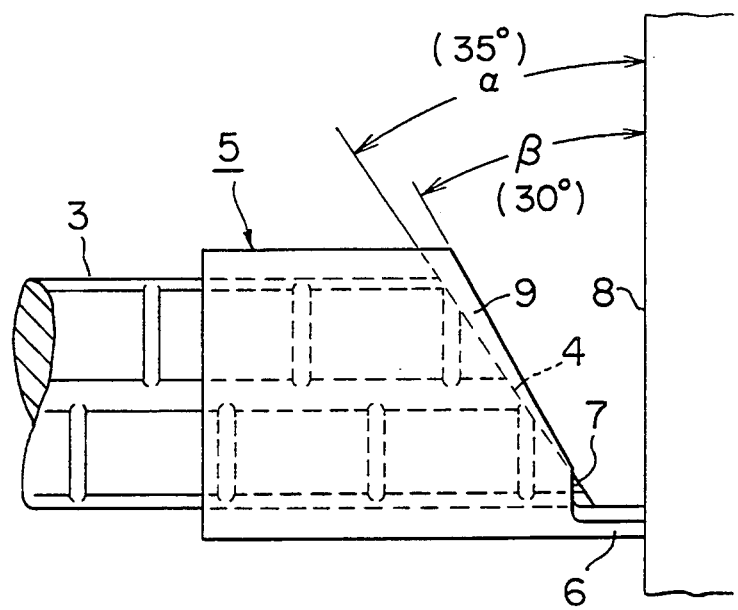
FIG. 7 is a side view illustrative of the relationships between the guide member, the end of a reinforcing bar, and a surface to which the bar is to be welded (steel column).

A perspective view of a guide member 5 used for the butt-arc-welding of a T-joint of steel bar in accordance with the present invention is shown in FIG. 1, a side view thereof is shown in FIG. 2, and a plan view thereof is shown in FIG. 3. As shown in these figures, the guide member 5 is made of steel and has a sleeve shape such that an end portion of a steel bar 3 (round bar or deformed reinforcing bar, such as JIS SR235) such as a reinforcing bar fits as tightly as possible therein. The guide member 5 is constructed in such a manner that it has a butting tab 6 extending forward from one end thereof, two guide edge portions 9 that start from diametrically opposite sides of a base portion of the butting tab (with partial perpendicular surfaces 7 therebetween) and extend gradually backward from a position at a distance from a surface to which the steel bar is to be welded 8 (see FIG. 7) of a component such as a steel column made of high-strength steel, and a slit 10 formed in the axial direction of end portions of the guide edge portions 9. The guide edge portions 9 are at an angle $\beta$ (about 30°) which is less than an angle $\alpha$ (normally 35°) with respect to the surface to which the bar is to be welded 8 of an oblique tip surface 4 formed at a slant at the tip of the steel bar 3, and also hold the steel bar 3 in such a manner that the oblique tip surface 4 is held slightly away from the surface to which the bar is to be welded 8, as shown in FIG. 7.

Figure 4:
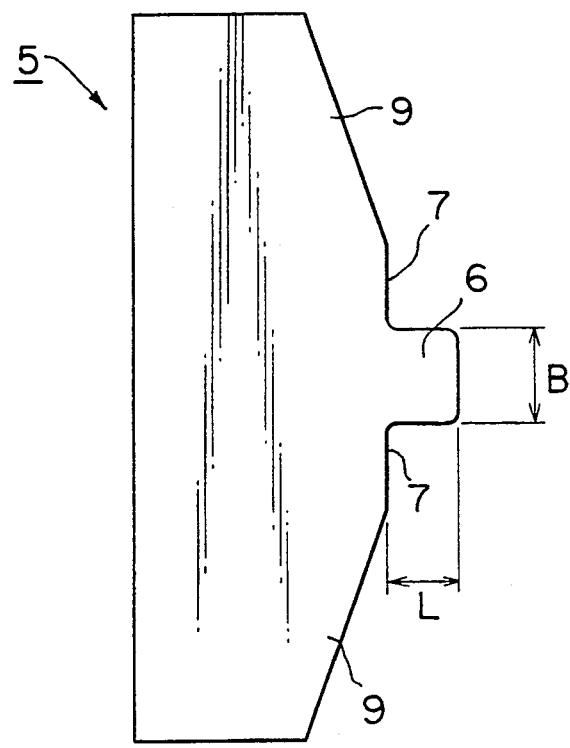
FIG. 4 is a flattened plan view of a blank of the guide member used in accordance with the present invention.
Figure 5:
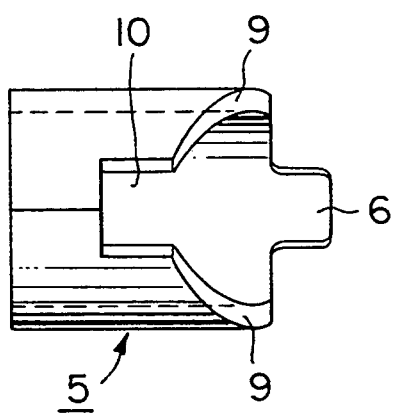
FIG. 5 is a plan view illustrative of one example of the shape of a slit provided in the guide member.
Figure 6:
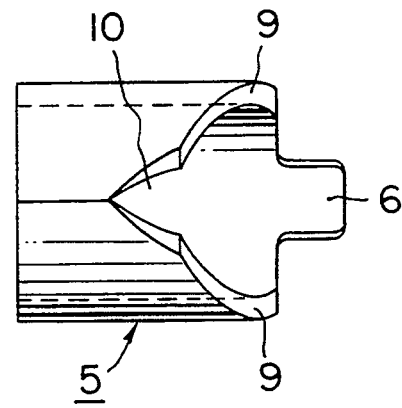
FIG. 6 is a plan view illustrative of another example of the shape of a slit provided in the guide member.

A flattened plan view of a blank for the guide member 5 is shown in FIG. 4. This blank of the guide member 5 is stamped out of mild steel plate (such as JIS G3101, SS400, G3106, SM400, SM490, or an equivalent) to form the butting tab 6 of a length of protrusion L and width B, then it is curved in a press and the slit 10 is also pressed to complete the guide member 5 of the prescribed shape. In this case, the slit 10 is formed in such a manner as to extend the full length of the guide member 5, as shown in FIG. 1. The width of the opening of this embodiment of the slit 10 has a dimension slightly smaller than the diameter of the steel bar 3, and is such that, when the tip of the steel bar 3 is fitted within the guide member 5, it is held therein in a firmly inserted state. The slit 10 need not extend the full length of the guide member 5; it could be created only near the upper end portion of the guide edge portions 9 as a rectangular cutout as shown in FIG. 5, or a V-shaped notch as shown in FIG. 6.

The length of protrusion L of the butting tab 6 (see FIG. 4) is between 6 mm and 9 mm when the diameter of the steel bar 3 is in the region of 25 mm, and the width B thereof is about 15 mm. When the guide member 5 is manufactured, the length of protrusion L could be made somewhat longer (about 15 mm) to enable the operator on site to plane off the tip of the butting tab 6 to suit the angle required for welding the steel bar 3 to the surface to which the bar is to be welded 8, without the steel bar 3 coming into contact with the surface to which the bar is to be welded 8. If the surface to which the bar is to be welded 8 is that of a circular column or a curved surface, the tip of the butting tab 6 can be trimmed on site to match that curve, to ensure that the tip fits closely against the surface to which the bar is to be welded 8.

The method of butt-welding a T-joint using the guide member 5 of the present invention will now be described.

Figure 8:
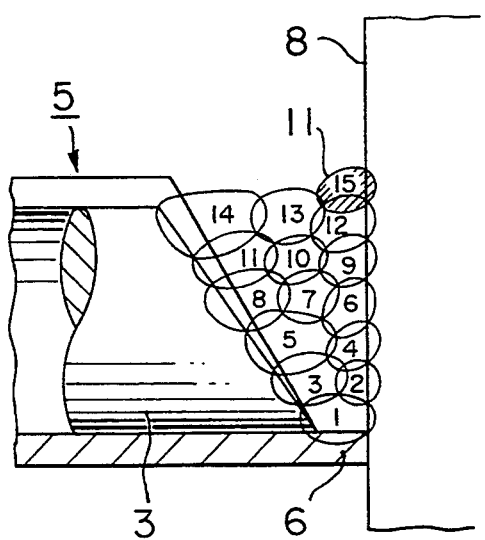
FIG. 8 is a view used to illustrate welding status within the guide member.
Figure 9:
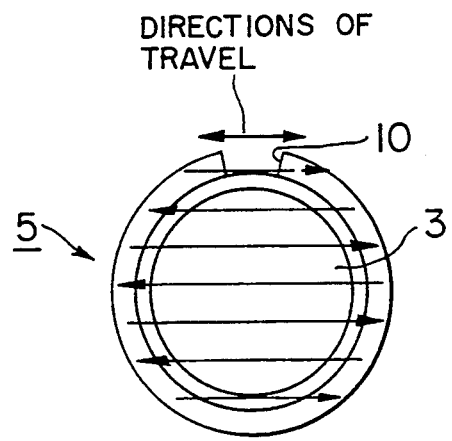
FIG. 9 is a view used to illustrate the guide member and the directions of travel of a welding rod.

The oblique tip surface 4 is formed at the end portion of the steel bar 3 (which has a diameter of 25 mm to 32 mm and has ribs and bands on the outer surface thereof) by planing it to the angle a (35°), then the guide member 5 is fitted around the end portion of the steel bar 3, which includes the oblique tip surface 4, in such a manner that the butting tab 6 extends from the end thereof, as shown in FIG. 7. The tip of the butting tab 6 of the guide member 5 is then pushed firmly against the surface to which the steel bar is to be welded 8 of the steel column, the welding rod (such as a coated electrode) is manually introduced through the slit 10, and the tip of the butting tab 6 is welded by either an AC or a DC welder. Subsequently, the weld is built up by laying weld beads between the oblique tip surface 4 and the surface to which the bar is to be welded 8, in accordance with the numerical sequence shown in FIG. 8 and the directions of travel shown in FIG. 9. During this time, the metal melted at the end of the steel bar 3 is prevented from running out of the guide member 5 by the guide edge portions 9 that cover that end, and thus the tip of the steel bar 3 is prevented from becoming thinner.

After weld beads have been built up to a position equivalent to the diameter of the steel bar 3, a strengthening fillet weld 11 (maximum 10 mm) is formed over a width of about 7 mm to 10 mm on the side of the surface to which the bar is welded 8, to complete the butt-arc-welded T-joint. Note that the strengthening fillet weld 11 used in this embodiment has the objective of preventing any degradation in the strength and toughness of the steel in the thickness direction of the rolled steel (Z direction) used for the column, and preventing low-strength cleavage of the material. This is one way in which weld reinforcement and weld buildup for shaping differ from each other.

Figure 10:
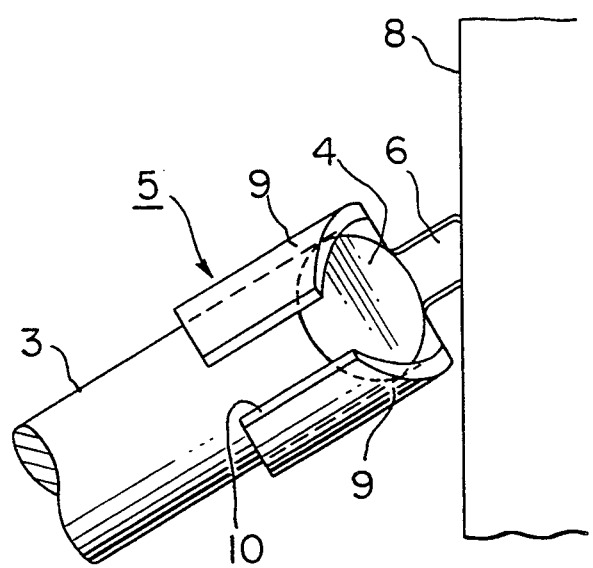
FIG. 10 is a plan view of a case in which a steel bar is held at a prescribed angle with respect to the surface to which the steel bar is to be welded, for butt-arc-welding

If the steel bar 3 is not to be welded perpendicular to the surface to which the bar is to be welded 8 but at a prescribed angle thereto, the tip of the butting tab 6 of the guide member 5 is trimmed on site to correspond to that angle, as shown in FIG. 10, and the remainder of the butt-arc-welding process is performed as described above.

Figure 11:
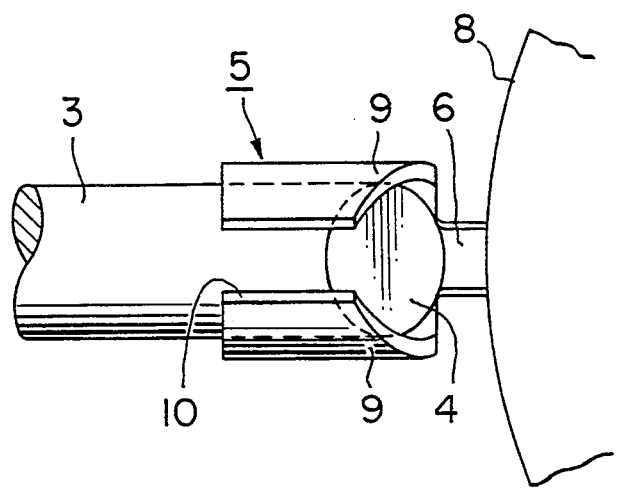
FIG. 11 is a plan view of a welding state when the surface to which the steel bar is to be welded is curved.

If the surface to which the bar is to be welded 8 is that of a circular column or a curved surface, the tip of the butting tab 6 of the guide member 5 is trimmed in a curved form to match the curve of the surface to which the bar is to be welded 8, as shown in FIG. 11, and the remainder of the butt-arc-welding process is performed as described above.

For welding up against a surface of a steel column where it is not possible to insert the welding rod into the slit 10 in the guide member 5 from above, such as immediately below a beam, the guide member 5 could be rotated far enough that the welding rod can be manually inserted through the slit, the oblique tip surface 4 of the end portion of the steel bar 3 is orientated to match, and thus arc-welding can be performed. In this case too, welding starts at the end portion of the butting tab 6 of the guide member 5 and is completed by the final formation of a strengthening fillet weld 11.

Note that the welding material is selected as appropriate for the strength and quality of the parent metal. To match a parent metal of a high strength, for a flat welding posture a rod conductor diameter of 4 mm is standard; for a vertical welding posture it is 3.2 mm. The welding rod is a coated arc-welding electrode.

Figure 12:
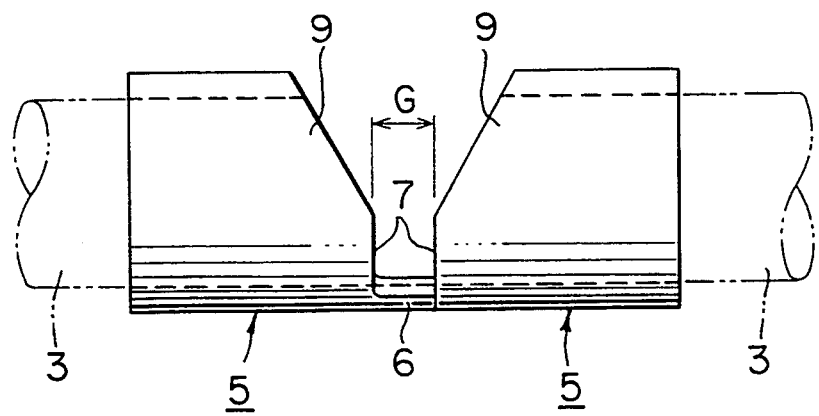
FIG. 12 is a side view of a case in which two steel bars are to be welded butt-to-butt horizontally.

If this method is used to weld together two steel bars 3 such as reinforcing bars to form a horizontal joint, two guide members 5 are used positioned facing each other, as shown in FIG. 12. In this case, the butting tab 6 of one guide member 5 (the one on the right in FIG. 12) is trimmed to adjust the gap G between the perpendicular surfaces 7 of the two guide members 5. The two guide members 5 are temporarily welded together, then the steel bars 3 having an oblique tip surface are inserted into the guide members 5 and are butt-welded together.

Figure 13:
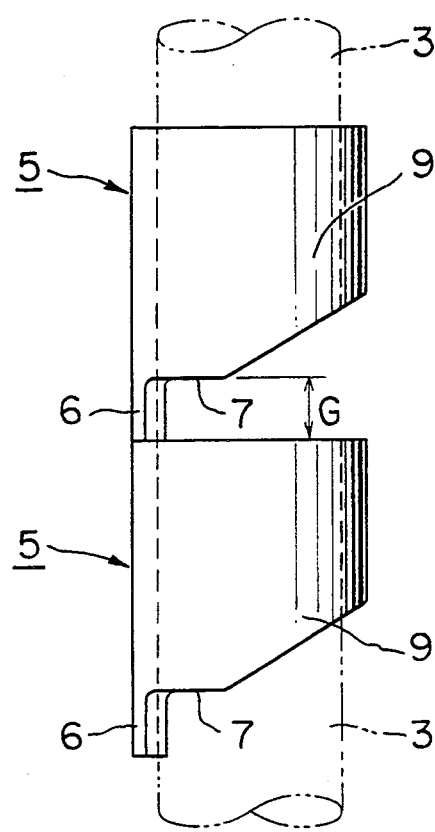
FIG. 13 is a side view of a case in which two steel bars are to be welded butt-to-butt vertically.
Figure 14:
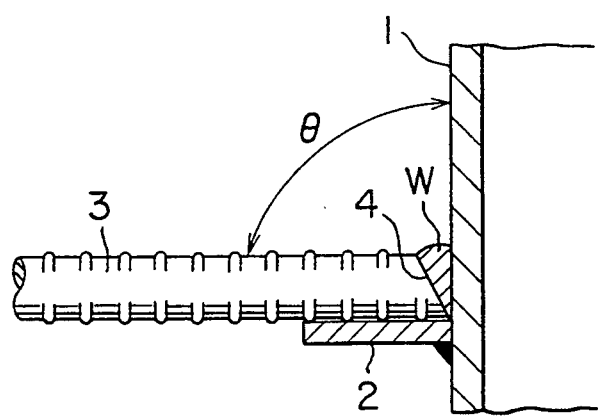
FIG. 14 is a view of the conventional method of butt-arc-welding a steel bar.

If this method is used to form a vertical joint of steel bars 3, two guide members 5 are aligned in the same direction, as shown in FIG. 13, the tip of the butting tab 6 of one guide member 5 is partially trimmed off to adjust the gap G between the two guide members 5, then the steel bars 3 are inserted into the guide members 5 and are butt-welded together.

What is claimed is:

1. A method of butt-welding steel bar, comprising the steps of:

forming an oblique tip surface having a prescribed angle at an end portion of a steel bar such as a reinforcing bar;

fitting said end portion of said steel bar within a guide member comprising a butting tab that extends forward, guide edge portions that start from diametrically opposite sides of a base portion of said butting tab and extend backward from a position at a distance from a surface to which said bar is to be welded, and protrude further outward than said oblique tip surface, and a slit formed in the axial direction of end portions of said guide edge portions;

trimming an end portion of said butting tab into an end shape in accordance with a surface to which said steel bar is to be welded and butting against said surface; and building up weld beads in sequence from the inner surface of said butting tab and between said surface to which said bar is to be welded and said oblique tip surface at said end portion of said steel bar to form a single weld.

2. The welding method of claim 1, wherein said end portion of said butting tab of said guide member is butted perpendicular to said surface to which said steel bar is to be welded.

3. The welding method of claim 1, wherein said end portion of said butting tab of said guide member is butted at an angle to said surface to which said steel bar is to be welded.

4. The welding method of claim 1, wherein said surface to which said steel bar is to be welded has a curved surface in cross-section and said end portion of said butting tab of said guide member is trimmed to match said curved surface and is butted thereagainst for said welding.

5. The welding method of claim 1, wherein said welding method is a manual arc welding.

6. A method of butt-welding steel bar, comprising the steps of:
- forming an oblique tip surface having a prescribed angle at end portion of two steel bars such as reinforcing bars;
- fitting each of said end portions of said steel bars within a guide member comprising a butting tab that extends forward, guide edge portions that start from diametrically opposite sides of a base portion of said butting tab and extend backward from a position at a distance from a surface to which said steel bar is to be welded, and protrude further outward than said oblique tip surface, and a slit formed in the axial direction of end portions of said guide edge portions;
- trimming one of said protruding tabs of said guide members;
- butting up end portions of said butting tabs against each other as a horizontal joint; and
- building up weld beads in sequence from the inner surface of said butting tabs and between said oblique tip surfaces at said end portions of said two steel bars to form a single weld.

7. A method of butt-welding steel bar, comprising the steps of:
- forming an oblique tip surface having a prescribed angle at end portions of two steel bars such as reinforcing bars are each planed at an angle;
- fitting each of said end portions of said steel bars within a guide member comprising a butting tab that extends forward, guide edge portions that start from diametrically opposite sides of a base portion of said butting tab and extend backward from a position at a distance from a surface to which said steel bar is to be welded, and protrude further outward than said oblique tip surface, and a slit formed in the axial direction of end portions of said guide edge portions;
- aligning said guide members in the same direction;
- butting up end portions of said butting tabs against each other as a vertical joint; and
- building up weld beads in sequence from the inner surface of said butting tabs and between said oblique tip surfaces at said end portions of said two steel bars to form a single weld.

8. A device for butt-welding steel bar being provided with a sleeve-shaped guide member of a prescribed length enabling it to fit around an end portion of a steel bar, said guide member comprising:
- a butting tab that extends forward from an outer end thereof;
- guide edge portions that start from diametrically opposite sides of a base portion of said butting tab and extend backward from a position at a distance from a surface to which said steel bar is to be welded, and protrude further outward than an oblique tip surface at said end portion of said steel bar; and
- a slit for the insertion of a welding rod, formed in the axial direction of end portions of said guide edge portions.

9. The device for butt-welding steel bar of claim 8, wherein said slit is formed to extend over the entire axial dimension of said guide members.

10. The device for butt-welding steel bar of claim 8, wherein said slit has a rectangular form.

11. The device for butt-welding steel bar of claim 8, wherein said slit has a V-shaped form.

* * * * *